3,338,780
METHYL ARSINE OXIDE METHOD OF CONTROLLING SOIL-BORNE PYTHIUM FUNGI

Arthur Schwerdle, Vineland, N.J., assignor to Vineland Chemical Company, Vineland, N.J., a partnership
No Drawing. Filed Aug. 10, 1964, Ser. No. 388,679
10 Claims. (Cl. 167—22)

The present invention relates to a novel method for the control and treatment of soil-borne fungus diseases of plants; and more particularly, the present invention relates to the control of soil-borne fungi, especially "snow mold," Pythium, Helminthosporium-Curvularia and Rhizoctonia fungi, in the soil in their various life stages, including the sclerotia stage.

Pythium, Helminthosporium-Curvularia and Rhizoctonia are probably the most important fungi which attack the roots of plants in general. Rhizoctonia causes seedling damping-off in a large number of crops, including vegetables, ornamentals, field crops and citrus; for example, it has been estimated that Louisiana cotton growers lose about 5% of their crop because of "soreshin" of cotton seedlings due to this soil-borne fungus. Pythium also causes damping-off of plant seedlings, like tomatoes. Members of the Helminthosporium-Curvularia complex have caused severe root rot on seedlings of rice and wheat, and blight in oats.

There are two common types of snow mold diseases on turf grasses. Gray snow mold (snow scald or winter scorch) caused Typhula, is the predominant type of snow mold found in New England. Pink snow mold or Fusarium patch, caused by *Calonectria nivalis* (*Fusarium nivale*), is common in Washington State along with the gray snow mold. Pythium or "grease spot" (caused by *Pythium aphanidermatum*) is a disease of turf grasses common to the southern part of the United States. Helminthosporium-Curvularia complex also causes a serious disease of turf grasses. "Brown patch," caused by *Rhizoctonia solani* causes considerable damage to turf grasses, and it, like Pythium, has been known to destroy entire putting greens overnight.

The foregoing fungi are soil borne and hence exist in the soil in various stages of the life cycle: spore, sclerotia and mycelium. In the sclerotia stage, these pathogens are "resting" bodies which have proven to be highly resistnat to chemicals, making control difficult.

Prior fungicides are largely limited in their ability to pass through soil and attack all three stages of the life cycle, including sclerotia, of the above-mentioned pathogens. Moreover, a successful fungicide against these pathogens must be effective at rates which are non-injurious to the desirable plant roots that may be present in the treated soil, and many fungicides do not have this ability.

Methyl arsine oxide has been suggested as having some fungicidal utility (see, for example, U.S. Patents 1,565,237, 1,652,291 and 2,054,062). However, such utility has been confined to treatment of the fungus disease itself at the site of the infection, such as on the seed or plant.

It is the principal object of the present invention to provide a novel method for controlling soil-borne fungi.

It is a further object of the present invention to provide a method for controlling soil-borne fungus diseases, injurious to plants, by treating soil to interrupt the life cycle of the harmful fungi therein whereby the ability of the soil to serve as a repository or life-supporting medium of potential infection of plants is greatly reduced or extinguished.

It is another object of the present invention to provide a method for the control of snow mold, Pythium, Helminthosporium-Curvularia and Rhizoctonia fungi in soil.

These and other objects will become apparent from a consideration of the following specification and the claims.

The method of the present invention comprises applying, to soil containing fungi injurious to plants, an aqueous solution of methyl arsine oxide at a rate of between about 0.2 and about 8 pounds of methyl arsine oxide per acre.

It has been found that methyl arsine oxide is highly effective in the soil against soil-borne fungi injurious to desirable plants, at rates of applications which can be well below the level at which the methyl arsine oxide is phytotoxic toward desirable plants, including turf grasses, which may be growing in the soil. It has been found that methyl arsine oxide does not become inactivated by materials in the soil at least until it has exerted its effect on the fungi organism. Moreover, it has been found that methyl arsine oxide, upon penetrating the soil, attacks and kills the fungi therein in the normally resistant sclerotia, or "resting," stage, as well as in the spore and mycelium stages. Thus, unexpectedly, methyl arsine oxide is able, in effect, to greatly reduce or extinguish the ability of the treated soil to harbor the harmfun fungi and to serve as a repository from which the fungi may attack plants, including roots, tubers, stems and foliage. Unlike the prior art which treated the "disease" itself at the side of infection, the present invention treats the pathogen source of the disease or infection, away from the side of the infection, thereby more effectively preventing subsequent infection.

The rates of application presently found to be suitable range from about 0.2 to about 8 pounds of methyl arsine oxide per acre. If there are present in the soil, desirable plants, like surf grass, which would be contacted by the solution by the particular mode of application, like broadcast spraying, it is recommended that either a rate in the lower portion of the range be used or the application, if in the upper portion of the rate range, be followed by liberal application of water to wash methyl arsine oxide from the plants into the soil. In most cases, a rate below about 1.5 pounds per acre will be sufficient whether or not there are desirable plants present which are contacted by the solution.

As stated, the methyl arsine oxide will be applied as an aqueous solution thereof, usually by spraying. The water in the solution is primarily a vehicle to aid in the easy dispersal of the compound over the area and to the soil at the desired rate. Once the methyl arsine oxide is applied to the soil, distribution of the compound into the soil will depend upon water content of the soil at the time of application, water subsequently applied to the treated soil (rain or after-watering) and natural diffusion of the compound, by virtue of the nature of the soil, in vapor—or liquid phase. Hence, as far as the application of the compound to the soil is concerned, the concentration of the methyl arsine oxide in the solution applied may range from about 25 p.p.m. to about 100,000 p.p.m.

The principal object to be achieved is to provide a concentration of methyl arsine oxide in the soil water which is effective against the fungi. The minimum such concentration is about 1 p.p.m. (1 part of methyl arsine oxide per million parts of water in the soil). As a practical matter the upper limit need be no more than about 125 p.p.m. As an illustration, taking a soil that contains 10%, by weight, of water and applying the methyl arsine oxide at a rate of 1 pound per acre, results in a concentration of methyl arsine oxide in the soil water of about 8 p.p.m., assuming the methyl arsine oxide penetrates to about 6 inches into the soil. Because of the amount of soil water involved, the amount of water added with the methyl arsine oxide is negligible. It will be realized that the concentration of methyl arsine oxide will not be uniform throughout the entire area or throughout the entire depth of penetration, and that the concentration is probably higher nearer the surface where, in any event, most of the organisms will be found. The concentration figures given above, therefore, are average, and may be considered as representing the average concentration in the first 6 inches of soil whether or not the methyl arsine oxide has actually penetrated to that depth.

While the methyl arsine oxide may be the only active ingredient present in the solution applied, it will be obvious that various adjuvants, like wetting agents, stabilizers, plant nutrients, other pesticides, including fungicides, and the like, may be included if desired.

As stated, the present invention is particularly adapted for the control of soil-borne fungi injurious to desirable plants. One area where the present invention finds wide application is in the treatment of soil bearing turf grass. Such turf grasses include bent grasses, like Astoria Colonial, seaside creeping and velvet bentgrasses; fescues, like Chewings fescue; bluegrass, like Merion and Kentucky bluegrasses; rye grasses, and the like.

As illustrative of the effects of methyl arsine oxide on snow mold in turf grasses, methyl arsine oxide is compared with several prior fungicides. Each of the materials, set forth in the table below, was randomly replicated three times on 25 square foot plots of seaside creeping bentgrass maintained as putting greens. Only one application was made. Each treatment was applied with a power sprayer equipped with an agitator, in the fall of the year at a rate of 10 gallons of solution per 1,000 square feet of turf. Disease ratings were taken the following March in terms of the percentage of each plot injured by Typhula snow mold (gray snow mold). The ratings of the three replicates were averaged and are set forth in the following table:

TABLE I

| Treatment | Amount Used | Rate (No./Acre) | Percent Typhula Injury |
|---|---|---|---|
| Control | Untreated | | 58.3 |
| Methyl arsine oxide (10%) | 76 ml | *0.73 | 0.0 |
| Cadmium succinate (60%) | 1.5 oz | 2.45 | 1.7 |
| Phenyl mercuric acetate (5%) | 3 oz | 0.41 | 3.3 |
| Mercurous chloride (30%) + mercuric chloride (30%) | 3 oz | 4.90 | 11.7 |

*The concentration of methyl arsine oxide in the applied solution was about 200 p.p.m.

As illustrative of the effects of methyl arsine oxide against Pythium in the presence of soil, the following tests have been carried out:

One inch of soil is placed on top of a one inch styrene foam plug in a glass shell vial having a small hole in the bottom to allow entrapped air to escape. On this layer of soil is placed a 5 mm. disc of agar and mycelium of *Pythium aphanidermatum*. An additional one inch of sterile soil is placed on top of this disc. 8 ml. of various aqueous solutions of varying concentrations of methyl arsine oxide are then carefully poured on top of the top layer of soil and allowed to drain through the soil. Each concentration of solution is replicated three times in separate vials. After twenty-four hours' incubation at 26° C., the agar fungus-containing discs are removed and planted on the corn meal-agar plates which are then incubated at 26° C. Results are recorded as the number of discs showing growth (+) or lack of growth (−). The results are tabulated as follows:

TABLE II

| Treatment | Conc. (p.p.m.) | Growth after Days Incubation | | | | |
|---|---|---|---|---|---|---|
| | | 1 | 2 | 3 | 4 | 5 |
| Control | | ¹3− | ²3+ | 3+ | 3+ | 3+ |
| Methyl arsine oxide | 10 | 3− | 3− | 3− | 3− | 3− |
| | 5 | 3− | 3− | 3− | 3− | 3− |
| | 2.5 | 3− | 3− | 3− | 3− | 3− |

¹ This means no growth in three replicates.
² This means growth in all three replicates.

Tests similar to the foregoing were also run using *Pythium ultimum* with the following results:

TABLE III

| Treatment | Conc. (p.p.m.) | Growth after Days Incubation | | | | |
|---|---|---|---|---|---|---|
| | | 1 | 2 | 3 | 4 | 5 |
| Control | | 3+ | 3+ | 3+ | 3+ | 3+ |
| Methyl arsine oxide | 50 | 3− | 3− | 3− | 3− | 3− |
| | 25 | 3− | 3− | 3− | 3− | 3− |

Similar tests, but using mycelium of *Rhizoctonia solani*, gave the following results:

TABLE IV

| Treatment | Conc. (p.p.m.) | Growth after Days Incubation | | | | |
|---|---|---|---|---|---|---|
| | | 1 | 2 | 3 | 4 | 5 |
| Control | | 2+ | 2+ | 3+ | 3+ | 3+ |
| Methyl arsine oxide | 10 | 3− | 3− | 3− | 3− | 3− |
| | 5 | 3− | 3− | 3− | 3− | 3− |

Similar tests, but using sclerotia of *Rhizoctonia solani*, gave the following results:

TABLE V

| Treatment | Conc. (p.p.m.) | Growth after Days Incubation | | |
|---|---|---|---|---|
| | | 1 | 2 | 3 |
| Control | | 3+ | 3+ | 3+ |
| Methyl arsine oxide | 400 | 3− | 3− | 3− |
| | 200 | 3− | 3− | 3− |
| | 100 | 3− | 3− | 3− |
| | 50 | 3− | 3− | 3− |
| | 25 | 3− | 3− | 3− |

In tests of a similar nature in which Curvularia spores were used and the test specimens were incubated at 20° C. for 20 hours, 100% control was achieved at 40 p.p.m. concentration of methyl arsine oxide and 98–99% control was obtained at 20 p.p.m. Field tests on seaside creeping and velvet bentgrasses during the summer, with applications at the rate of 0.37 pounds of methyl arsine oxide per acre and a concentration of about 100 p.p.m. in water at intervals of 8, 10, 8, 8, 9, 10, 10, 8, 12 and 10 days, provided good control of the Helminthosporium-Curvularia complex.

Field tests were conducted during the summer on a practice putting green of creeping bentgrass that is usually severely attacked by "brown patch" (*Rhizoctonia solani*). Two treatments with methyl arsine oxide, one at a concentration of methyl arsine oxide in water at about 33 p.p.m., the other at a concentration of 100 p.p.m., and both at a rate of .35 pound of methyl arsine oxide per acre, and an untreated control, were randomly replicated three times on plots of 100 sq. ft. each. Seven applications at two-week intervals were made. The treatment provided excellent control in that no brown patch injury was observed in any of the treated plots, whereas the three control plots reached an average of 10% injury due to brown patch.

Field tests were conducted to determine control of cotton seedling damping-off caused by *Rhizoctonia solani*. Cotton seed beds were sprayed (furrow sprayed) with a solution of methyl arsine oxide (5,000 p.p.m.) at the rate of 0.2 pound of methyl arsine oxide per acre. This gave a 10% greater emergence of cotton seedlings than the untreated control plots.

Tests in the field have also shown the effectiveness of methyl arsine oxide against Pythium. In Smyrna, Ga., during the late summer when Pythium disease is prevalent, plots of clay soil were laid out permitting two replicates for each treatment and a control. Each plot was watered well with water containing a nonionic wetting agent (alkyl aryl polyether alcohol) in an amount of 15 ml. of wetting agent per 10 gallons of water per 1000 square feet. Then aqueous solutions of methyl arsine oxide, all at a concentration of 100 p.p.m. (and all containing said wetting agent on the basis of 1 ml. thereof per 2.5 gal. water), were applied to selected plots (two replicates) at rates of 3.65, 5.47 and 7.3 pounds per acre, respectively. The next day, a selected portion of each plot was seeded with annual rye grass, at the rate of 60 pounds of seed per 1000 sq. ft., mulched and watered. On each of three successive days thereafter, selected portions of each plot were similarly seeded, mulched and watered. Each day after planting, the mulch on each test area was moistened to provide conditions conducive to Pythium. On the tenth day from the initial seeding, the mulch was raked from the areas seeded the first three days, and all plots were fertilized with an aqueous solution of a commercial water-soluble 23-21-17 turf fertilizer. The seed in all plots, including the control, germinated and grew, and there was no significant difference in the appearance of the grass on each plot. However, on the eleventh day after the initial seeding, the grass on the control plot had the characteristic gray appearance of Pythium, and within a few days more all the grass in the control plot was dead. The grass on all the treated plots remained healthy.

Modification is possible in the techniques of application and in organisms treated without departing from the scope of the invention.

I claim:
1. The method of controlling soil-borne Pythium fungus diseases injurious to plants which comprises applying to soil containing Pythium fungi injurious to plants an aqueous solution of methyl arsine oxide in an amount substantially to kill said fungi.

2. The method of claim 1 wherein the methyl arsine oxide is applied at a rate of between about 0.2 and about 8 pounds per acre.

3. The method of claim 2 wherein the methyl arsine oxide is applied at a rate not over about 1.5 pounds per acre.

4. The method of claim 1 wherein the methyl arsine oxide is applied at a rate to provide, in the first six inches of soil, a concentration of methyl arsine oxide in the soil water of between 1 and about 125 parts per million.

5. The method of claim 2 wherein the soil contains no desirable plants growing therein.

6. The method of claim 2 wherein the soil contains desirable plants growing therein; wherein the methyl arsine oxide solution is sprayed over the area including the plants at a rate above about 1.5 pounds per acre, and wherein water is subsequently applied to wash methyl arsine oxide from the plants to the soil.

7. The method of claim 6 wherein the soil contains growing turf grass.

8. The method of claim 3 wherein the soil contains growing turf grass.

9. The method of claim 1 wherein said Pythium fungi is found together with at least one of those selected from the group consisting of snow mold, Helminthosporium-Curvularia and Rhizoctonia.

10. The method of claim 1 wherein at least a portion of said fungi is in its sclerotia stage of the life cycle.

References Cited

UNITED STATES PATENTS

| | | | |
|---|---|---|---|
| 1,565,237 | 12/1925 | Schmidt et al. | 167—15 |
| 1,652,291 | 12/1927 | Tanner | 167—41 |
| 2,678,265 | 5/1954 | Schwerdle | 71—2.7 |
| 3,056,668 | 10/1962 | Sprague | 71—2.1 |

FOREIGN PATENTS 1,079,886   4/1960   Germany.

OTHER REFERENCES

Adams et al.: "Progress Report on Methyl Arsine Oxide," 2 pp., reprint Golf Course Reporter, May 1964.

LEWIS GOTTS, *Primary Examiner.*

S. K. ROSE, *Assistant Examiner.*